May 22, 1928.
W. N. BOOTH
1,670,491
VEHICLE WHEEL
Filed June 15, 1925        2 Sheets-Sheet 1
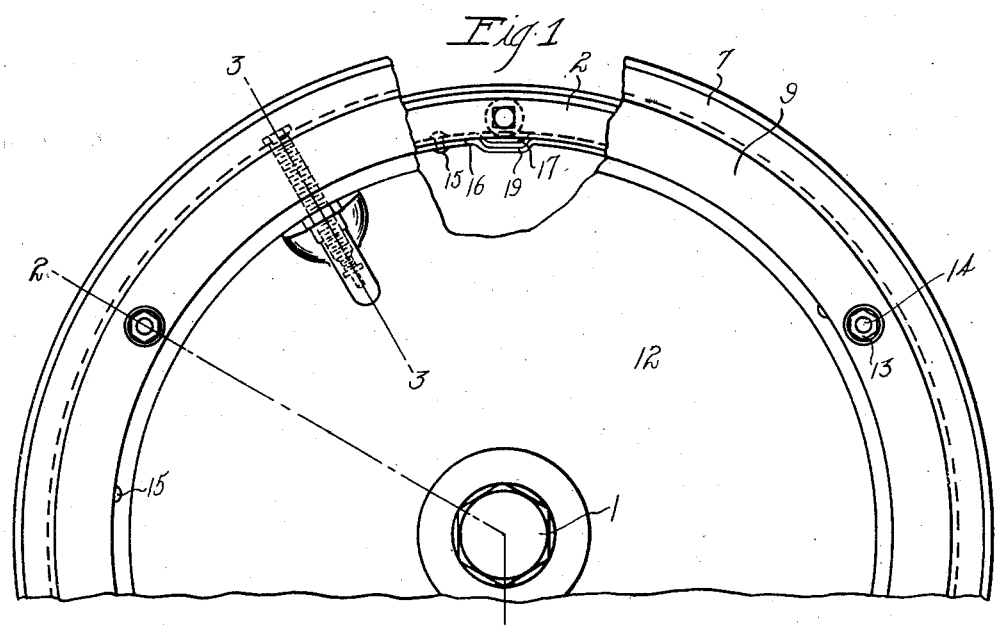
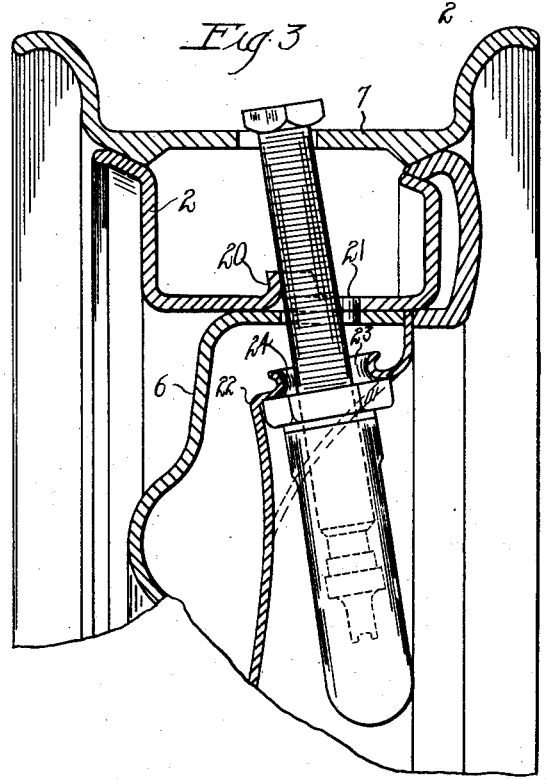
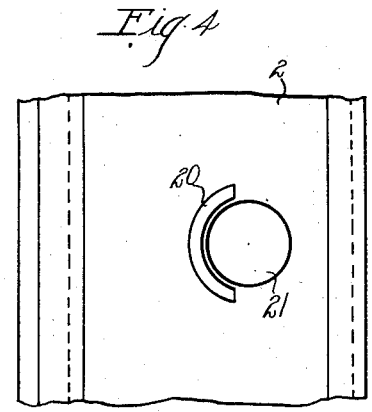
Inventor
William N. Booth
Attorneys

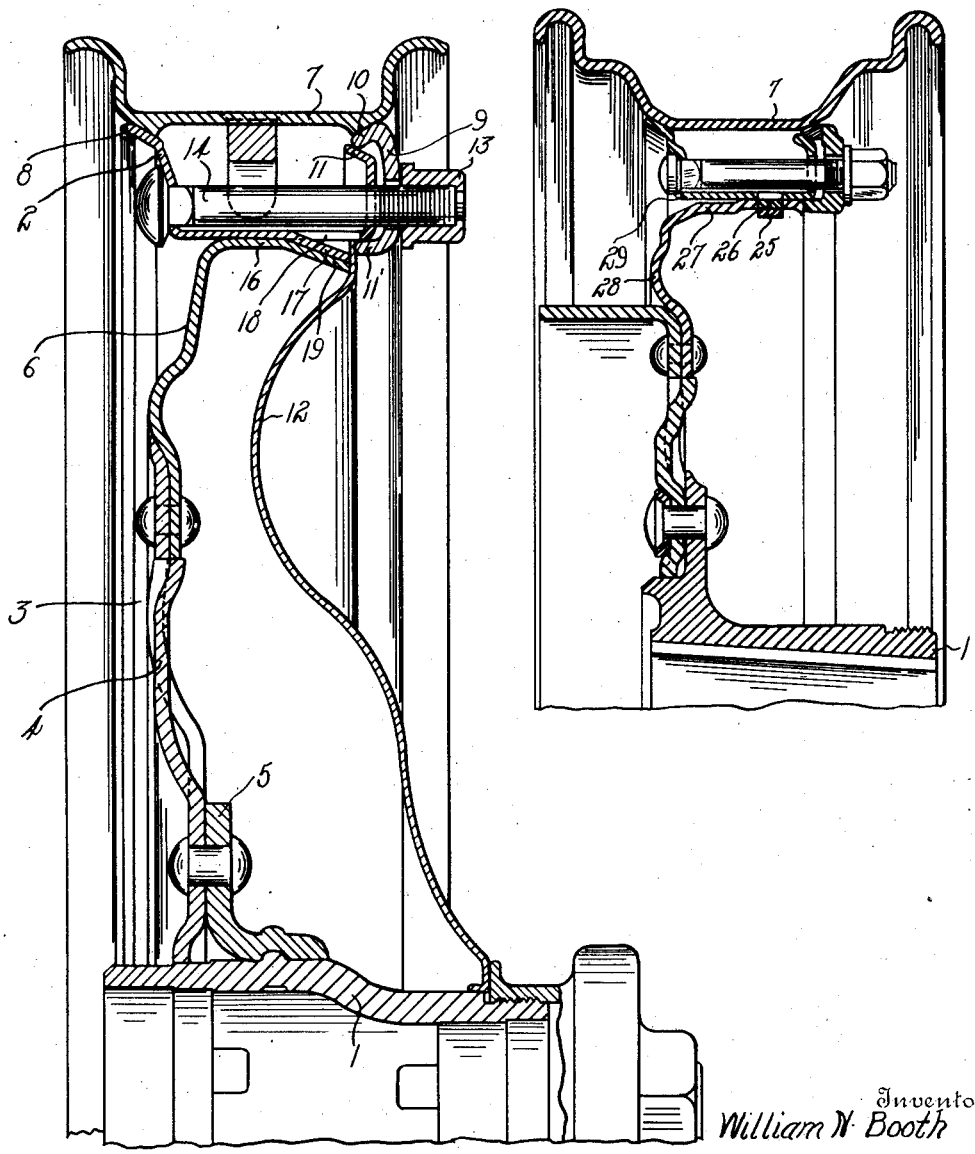

Patented May 22, 1928.

1,670,491

UNITED STATES PATENT OFFICE.

WILLIAM N. BOOTH, OF DETROIT, MICHIGAN.

VEHICLE WHEEL.

Application filed June 15, 1925. Serial No. 37,334.

The invention relates to vehicle wheels and has for one of its objects an improved arrangement for firmly securing a rim to the wheel web. Another object is the provision of a common means for securing the permanent rim or felly to the wheel web and for limiting the movement of the clamping means for the demountable rim. A further object is the provision of a lug upon the permanent rim or felly having an extended bearing with the valve stem to guide the same. With these as well as other objects in view the invention resides in the novel features of construction and combinations and arrangements of parts as more fully hereinafter set forth.

In the drawings:—

Figure 1 is a side elevation partly broken away of a portion of a vehicle wheel embodying my invention;

Figures 2 and 3 are cross sections on the lines 2—2 and 3—3 of Figure 1;

Figure 4 is a plan view of a portion of the permanent rim or felly;

Figure 5 is a view similar to Figure 2 and showing a modified vehicle wheel.

1 is the hub of a motor vehicle wheel, 2 is an annulus constituting a permanent rim or felly and 3 the wheel web extending between the permanent rim or felly and the hub and comprising the inner web member 4 which is secured to the fixed annular flange 5 of the hub and the outer web member or spacer 6 which is secured to the inner web member and to the permanent rim or felly. 7 is the demountable rim which is adapted to seat upon the flared flange 8 at the outer edge of the rear side flange of the permanent rim or felly. For clamping the demountable rim to its seat I have provided as shown in the present instance the channel shaped clamping ring 9 having the outer leg 10 engageable with the demountable rim and with the flared seat 11 at the outer edge of the front side flange of the permanent rim or felly. The inner leg 11' of the clamping ring overlaps the base of the permanent rim or felly and is arranged to contact with the outer edge portion of the cover plate 12 to clamp the same in place. The clamping ring is adjusted inwardly by means of the nuts 13 threaded upon the bolts 14, which latter extend transversely of and through the side flanges of the permanent rim or felly.

For rigidly securing the permanent rim or felly upon the spacer 6 I have provided in addition to the rivets 15 which extend through the base of the permanent rim or felly and the cylindrical flange portion 16 of the spacer the peripherally spaced tongues 17 which are located intermediate the rivets and inwardly struck from the base of the permanent rim or felly and engage in the recesses 18 formed by striking inwardly the tongues 19 upon the cylindrical flange portion 16. Both the tongues of the permanent rim or felly and of the spacer 6 are preferably simultaneously struck out so that the former tongues closely fit in the recesses formed in striking out the latter tongues.

These tongues in addition to firmly securing the permanent rim or felly to the spacer have shoulders at their ends which are spaced inwardly relative to the base of the permanent rim or felly and are engageable by the cover plate 12, which in turn is engageable by the inner leg of the clamping ring. It will thus be seen that the tongues function both in securing the permanent rim or felly to the spacer and in limiting the movement of the clamping means.

For the purpose of guiding the valve stem of the tire carried by the demountable rim 7 I have provided upon the base of the permanent rim or felly the semi-circular outwardly struck tongue 20 which is located at the rear side of the opening 21 in the base of the permanent rim or felly for the passage of the valve stem. With this arrangement an extended guiding bearing is provided engageable with the valve stem.

The cover plate 12 preferably has the outwardly depressed portion 22 having the aperture 23 therein in substantial alignment with the aperture 21 for the passage of the valve stem. The opening 23 is surrounded by the return bent flange 24 formed integral with the depressed portion of the cover plate. The depressed portion of this cover plate is preferably formed with a flat inner side for engagement by the clamping nut which is threaded upon the valve stem.

The modified vehicle wheel shown in Figure 5 has the same general arrangement of parts as the vehicle wheel previously described with the exception that the cover plate is omitted and that the inwardly struck tongues 25 and 26 respectively upon the cylindrical flange portion 27 of the spacer 28 and the base of the permanent rim or felly 29 are located inwardly of the edge of the cylindrical flange portion. These tongues however will assist in rigidly securing the permanent rim or felly to the web of the wheel.

What I claim as my invention is:

1. In a vehicle wheel, the combination with an annulus, of a web member secured to said annulus and means for securing said annulus to said web member, including an inwardly struck tongue upon said annulus engaging in a recess in said web member.

2. In a vehicle wheel, the combination with an annulus, of a web member secured to said annulus and provided with a flange portion, and means for securing said annulus to said web member including an inwardly struck tongue upon said annulus engaging in a recess in said flange portion.

3. In a wheel, the combination with a web member provided with a flange portion having an inwardly struck tongue, of a felly engaging said flange portion and having a base with an inwardly struck tongue engaging in the recess formed by striking out the tongue of said flange portion.

4. In a vehicle wheel, the combination with a felly having a seat for a demountable rim and clamping means for said demountable rim including a member having a portion extending under said felly, of a wheel web for supporting said felly and common means for securing said felly to said wheel web and for limiting the movement of said clamping means.

5. In a vehicle wheel, the combination with a felly having a seat for a demountable rim and clamping means for said demountable rim including a member having a leg underlying said felly, of a wheel web for supporting said felly having a portion for limiting the inward movement of said leg of the clamping means, and an inwardly struck tongue upon said felly engaging in a recess in said wheel web.

6. In a vehicle wheel, the combination with a web member of the wheel and a felly supported upon said web member, of means upon said felly providing an extended bearing for engagement with the valve stem of the tire carried by the wheel.

7. In a vehicle wheel, the combination with a felly and a demountable rim thereon, said felly having an opening therein for the passage of the valve stem of the tire carried by the demountable rim, of a tongue upon said felly having an extended bearing surface for contacting with the valve stem.

8. In a vehicle wheel, the combination with a channel shaped felly and a demountable rim seated upon said felly and carrying a tire, the base of said felly having an opening therein for the passage of the valve stem of the tire, of an upwardly struck semi-circular tongue at one side of the opening and providing an extended bearing surface for engagement with the valve stem.

In testimony whereof I affix my signature.

WILLIAM N. BOOTH.